United States Patent
Liu et al.

(10) Patent No.: US 7,113,279 B2
(45) Date of Patent: Sep. 26, 2006

(54) VARIABLE POLARIZATION INDEPENDENT OPTICAL POWER SPLITTER

(75) Inventors: Wen Liu, Wuhan (CN); Keyu Wu, Wuhan (CN); Yong Luo, Wuhan (CN)

(73) Assignee: Accelink Technologies Co., Ltd., Wuhan (CN)

( * ) Notice: Subject to any disclaimer, the term of this patent is extended or adjusted under 35 U.S.C. 154(b) by 43 days.

(21) Appl. No.: 10/845,900

(22) Filed: May 5, 2004

(65) Prior Publication Data

US 2005/0068631 A1 Mar. 31, 2005

Related U.S. Application Data

(60) Provisional application No. 60/528,204, filed on Dec. 10, 2003.

(30) Foreign Application Priority Data

Sep. 29, 2003 (CN) .............................. 03 1 25463

(51) Int. Cl.
*G01J 4/00* (2006.01)
(52) U.S. Cl. .................................... 356/365
(58) Field of Classification Search .................. None
See application file for complete search history.

(56) References Cited

U.S. PATENT DOCUMENTS

| 4,666,234 A | 5/1987 | Emkey |
| 5,064,267 A | 11/1991 | Rossberg |
| 5,740,288 A | 4/1998 | Pan |
| 6,031,948 A | 2/2000 | Chen |
| 6,594,054 B1 * | 7/2003 | Dragone ..................... 398/147 |
| 6,643,433 B1 | 11/2003 | Gonthier et al. |
| 6,718,082 B1 * | 4/2004 | Zhao et al. .................. 385/16 |

* cited by examiner

*Primary Examiner*—Tu T. Nguyen
(74) *Attorney, Agent, or Firm*—Victoria Donnelly

(57) ABSTRACT

A variable polarization independent optical power splitter is disclosed. An input light beam "A" is split into two output light beams "M" and "N" where the optical power ratio of the two output light beams "M" and "N" is adjusted to a desired ratio by controlling a variable polarization rotator, e.g. a liquid crystal unit. The polarization components "P" and "S" of the input light beam "A" are separated in a first polarization separator, then processed through the variable polarization rotator, and a second polarization separator. The polarization independence of the power split is thus achieved through the stratagem of processing the "P" and "S" polarized components of the input light beam "A" separately, resulting in four light beams "H", "I", "L" and "K", which are appropriately combined in the polarization combiner to yield the output light beams "M" and "N" having the desired optical power ratio "R".

20 Claims, 11 Drawing Sheets

VARIABLE POLARIZATION INDEPENDENT OPTICAL POWER SPLITTER

RELATED APPLICATIONS

This patent application claims priority from the U.S. provisional patent application to Liu, Wen Ser. No. 60/528,204 entitled "Tunable Optical Power Splitters" and filed Dec. 10, 2003, and a Chinese patent application to Liu, Wen Serial No. 03125463.2 entitled "Tunable Optical Power Splitters" and filed Sep. 29, 2003.

FIELD OF THE INVENTION

The invention relates to optical power splitters, specifically optical power splitters that permit a variable adjustment of the ratio of the split, and where the split is independent of the polarization of the incident beam.

BACKGROUND OF THE INVENTION

Optical power splitters are required in many types of optical communications networks, such as long haul networks, metropolitan networks, and access networks, as well as in optical multiplexers and switches of such networks.

Fused fiber couplers can be used as optical power splitters, and have been known for many years as described, for example in U.S. Pat. Nos. 4,666,234, 5,064,267, 6,031,948, and 6,643,433, and have also been used within more complex optical systems, see e.g. U.S. Pat. No. 6,031,948.

In modern fiber optic telecommunications, much reliance is being placed on the state of polarization of light signals. Typically the polarization of the signal is used to help direct the signal along the fiber optic network. Network components or devices which function based upon the polarization of the light signal include fiber optic polarization tunable filters, depolarizers, binary polarization switch/modulators, polarization division multiplexers and many other polarization related fiber optic components. Many of these devices require fiber optic variable polarization beam splitters and/or combiners.

A variable polarization beam splitter in which the optical power split ratio is dependent on the polarization state of the light beam, and where the power split ratio can be controlled by means of liquid crystal cells, is described in U.S. Pat. No. 5,740,288.

However, for applications where the polarization state of the light beam is not known, and where a variable power split ratio is required, the beam splitters described in any of the aforementioned patents are not suitable: either the power split ratio is fixed, or the splitter relies on the polarization state of the light beam. One such application where both capabilities, that is a variable power split ratio as well as polarization independence, are required is in fiber CATV broadcast networks. In such system, the service company usually has to deploy a number of optical power amplifier to make sure that each end user will get enough optical power. With a variable power splitter, the optical power could be variable deploy among these end users. In this way the power margin could be shared and many amplifiers could be saved. Because the power may be deployed close to end user side, and at many different locations, the input light beam polarization state is difficult to know, so that the polarization independence device becomes a key issue for such applications.

Consequently, it is necessary to develop a variable optical power splitter providing polarization independence.

SUMMARY OF THE INVENTION

It is an objective of the present invention to provide a variable polarization independent optical power splitter, and a method for splitting the power of an input light beam of an arbitrary polarization into two or more output light beams having an adjustable power ratio between all the output light beams, the power ratio being substantially independent of the polarization of the input light beam.

According to one aspect of the invention there is provided an optical power splitter for splitting the power of a light beam "A" of an arbitrary polarization into two light beams "M" and "N" having an adjustable power ratio between the beams, the power ratio being substantially independent of the polarization of the light beam "A", the power splitter comprising:

a first polarization separator receiving the light beam "A" and splitting said beam "A" into a light beam "B" having one of the P-polarization and S-polarization, and a light beam "C" having the other polarization;

a first fixed polarization rotator receiving said light beam "B" and converting it into a light beam "D" having the same polarization as the light beam "C";

a variable polarization rotator receiving said light beams "C" and "D", rotating their polarization in an adjustable manner, thus converting the light beams "C" and "D" into light beams "E" and "F" having the same rotated polarization respectively;

a second polarization separator receiving said light beams "E" and "F", and splitting said beam "E" into a light beam "G" having one of the P-polarization and S-polarization, and a light beam "H" having the other polarization; and splitting said beam "F" into a light beam "I" having the same polarization as the light beam "G", and a light beam "J" having the same polarization as the light beam "H";

a second fixed polarization rotator receiving the light beam "J" having one of the P-polarization and S-polarization, and converting it into a light beam "L" having the other polarization;

a third fixed polarization rotator receiving the light beam "G" having one of the P-polarization and S-polarization, and converting it into a light beam "K" having the other polarization; and a polarization combiner receiving said light beams "K", "I", "H" and "L", and combining the light beams "K" and "I" into the light beam "N", and the light beams "H" and "L" into the light beam "M";

whereby the adjustable power ratio between the beams "M" and "N" is controlled by adjusting the variable polarization rotator.

Preferably, the second polarization separator is a birefringent displacer or a Wollaston prism, and the first polarization separator and the polarization combiner are birefringent displacers.

Beneficially, the variable polarization rotator is a liquid crystal unit. Alternatively, the variable polarization rotator may be an opto-mechanical polarization changer, e.g. having a retardation slope wave plate coupled to a electromechanical actuator or a rotatable half wave plate coupled to a electromechamical actuator.

Conveniently, the first, second and third fixed polarization rotators are half wave plates. Additionally, the optical power splitter may further comprise a collimator for collimating the light beam "A", and/or an output unit including a dual fiber collimator for receiving and collimating the light beams "M" and "N". If required, the output unit may further comprise a roof prism.

In order to be compact, the optical power splitter may further comprise an optical deflection means including at least one reflector for reflecting the light beams "G", "H", "I" and "J" in space. Conveniently, said at least one reflector includes means for detecting a small fraction of at least one of the light beams being reflected. Beneficially, the optical deflection means include first and second reflectors to reflect the beams by substantially 180 degrees.

The optical power splitter, using the variable polarization rotator in the form of the opto-mechanical polarization changer, may comprise an optical deflection means including a first reflector for reflecting the light beams "C" and "D" in space, and a second reflector for reflecting the light beams "E" and "F" in space.

According to another aspect of the invention there is provided a method for splitting the power of an input light beam of an arbitrary polarization into two output light beams having an adjustable power ratio between the output light beams, the power ratio being substantially independent of the polarization of the input light beam, the method comprising the steps of:

(a) splitting the input light beam into first and a second orthogonally polarized light beams;

(b) converting the polarization state of one of the orthogonally polarized light beams of the step (a) into the other polarization, while leaving the polarization of the other orthogonally polarized light beam unchanged;

(c) rotating the polarization state of the light beams passed through the step (b) in an adjustable manner, resulting in the two light beams having the same rotated polarization;

(d) splitting each of the light beams after the step (c) into two orthogonally polarized light beams, resulting in four light beams each two of which have the same polarization;

(e) selecting the two beams after the step (d) of the same polarization, changing the polarization of one of the selected two beams into the other orthogonal polarization;

(f) selecting the other two beams after the step (d) of the same polarization, changing the polarization of one of the selected two beams into the other orthogonal polarization;

(g) combining the light beams from the step (e) into a first output light beam, and the light beams from the step (f) into a second output light beam.

A corresponding optical power splitter for splitting the power of an input light beam of an arbitrary polarization into two output light beams having an adjustable power ratio between the output light beams, the power ratio being substantially independent of the polarization of the input light beam, the power splitter comprising means for implementing the steps of the method as described above, is also provided. The optical power splitter comprises:

(a) means for splitting the input light beam into first and a second orthogonally polarized light beams;

(b) means for converting the polarization state of one of the orthogonally polarized light beams from the means (a) into the other polarization;

(c) means for rotating the polarization state of the light beams passed through the means (b) in an adjustable manner, resulting in the two light beams having the same rotated polarization;

(d) means for splitting each of the light beams after the means (c) into two orthogonally polarized light beams, resulting in four light beams each two of which have the same polarization;

(e) means for changing the polarization of one of the two beams after the means (d) of the same polarization into the other orthogonal polarization;

(f) means for changing the polarization of one of the other two beams out of the four light beams after the means (d) of the same polarization into the other orthogonal polarization; and (g) means for combining the light beams from the means (e) into a first output light beam, and the light beams from the means (f) into a second output light beam.

According to yet another aspect of the invention there is provided a method for splitting the power of an input light beam of an arbitrary polarization into a required number of output light beams having an adjustable power ratio between all the output light beams, the power ratio being substantially independent of the polarization of the input light beam, the method comprising the steps of:

(a) splitting the input light beam into a pair of orthogonally polarized light beams;

(b) converting the polarization state of one of the light beams of the pair of the step (a) into the other polarization, while leaving the polarization of the other light beam in the pair unchanged;

(c) rotating the polarization state of the pair of light beams from the previous step in an adjustable manner, resulting in the two light beams of the pair having the same rotated polarization;

(d) splitting each of the light beams of the pair after the step (c) into two orthogonally polarized light beams, resulting in four light beams, each two of which forming a pair of the same polarization;

(f) for each pair of light beams of the step (d), repeating the steps (c) to (d), each time doubling the number of light beam pairs until the number of light beam pair is not less than the required number of output light beams; and (g) for each of the required number of output light beams:
(i) selecting a pair of light beams from the step (f);
(ii) converting the polarization state of one of the selected light beams of the pair of the step (i) into the orthogonal polarization, while leaving the polarization of the other light beam of the pair unchanged; and
(iii) combining the light beams of the pair from the step (ii) into one of the output light beams.

A corresponding optical power splitter for splitting the power of an input light beam of an arbitrary polarization into a required number of output light beams having an adjustable power ratio between all the output light beams, the power ratio being substantially independent of the polarization of the input light beam, the power splitter comprising means for implementing the steps of the method as described above, is also provided. The optical power splitter comprises:

(a) means for splitting the input light beam into a pair of orthogonally polarized light beams;

(b) means for converting the polarization state of one of the light beams of the pair outputted from the means (a) into the other polarization, while leaving the polarization state of the other beam of the pair unchanged;

a first block, including:
- (c) means for rotating the polarization state of the pair of light beams from the means (b) in an adjustable manner, resulting in the two light beams of the pair having the same rotated polarization;
- (d) means for splitting each of the light beams of the pair after the means (c) into two orthogonally polarized light beams, resulting in four light beams, each two of which forming a pair of the same polarization;
- (f) a hierarchical arrangement of additional blocks including means the same as the means (c) and (d) sufficient in number to produce the required number of output light beams, each block receiving one pair of light beams from the first block or another block of the hierarchical arrangement; and
- (g) an output means for each of the required number of output light beams, comprising:
  - (i) means for converting the polarization state of one of the light beams of a selected pair of the light beams from the hierarchical arrangement (f) into the orthogonal polarization, while leaving the polarization of the other light beam of the selected pair unchanged; and
  - (ii) means for combining the light beams of the pair after the means (i) into one of the output light beams.

BRIEF DESCRIPTION OF THE DRAWINGS

The invention will now be described in greater detail with reference to the attached drawings, in which.

DETAILED DESCRIPTION OF THE PREFERRED EMBODIMENTS

The embodiments of the invention are based on optical components, individually having known properties, but configured in a number of novel configurations to achieve the goals of the invention.

First Embodiment 100 of the Invention

Figure 1:
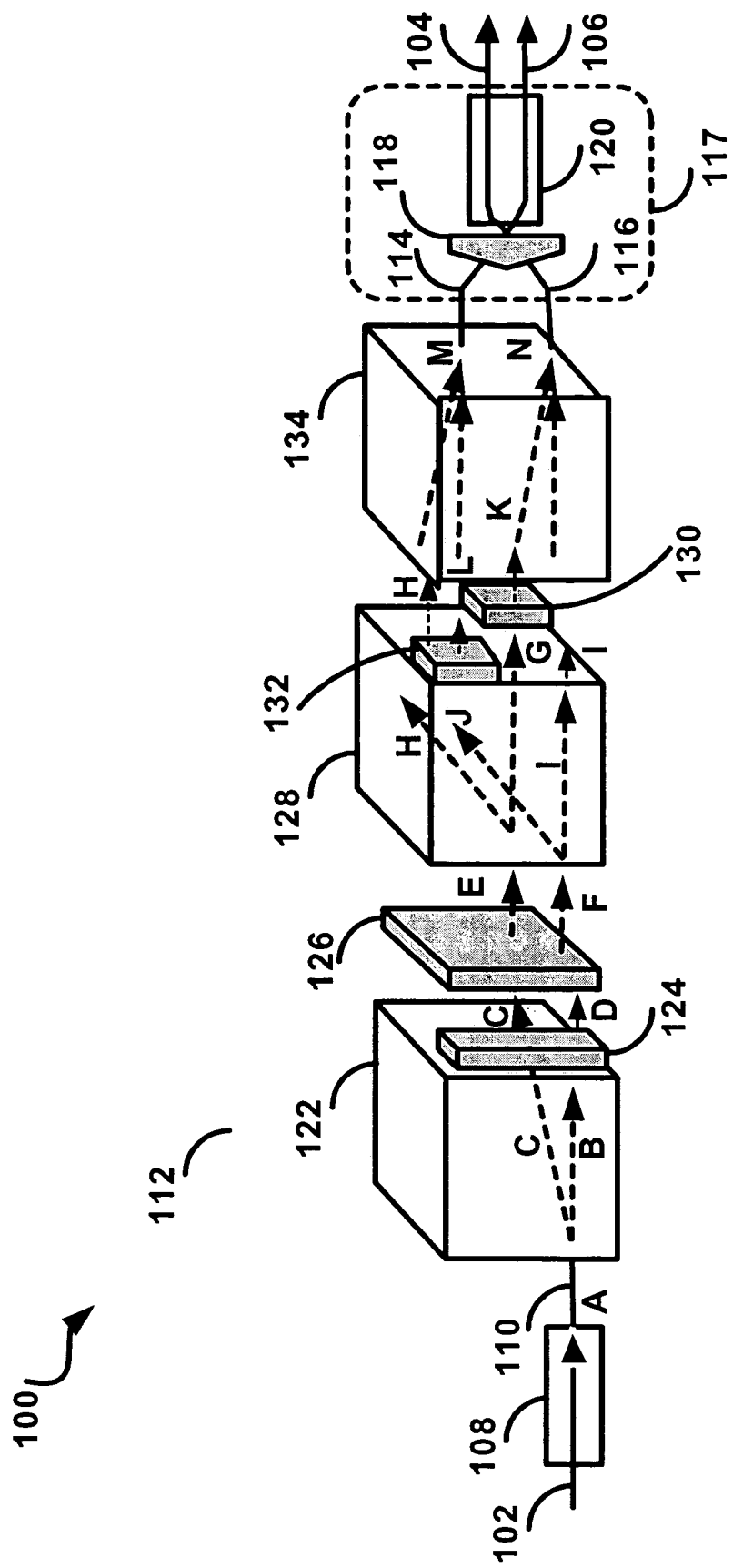
FIG. 1 is an illustration of a first embodiment of the invention.

FIG. 1 is an illustration of a first embodiment 100 of the invention, showing a 1:2 optical splitter, having an optical input 102 and two optical outputs 104 and 106. The optical input fiber 102 is coupled to a standard collimator 108. The output of the standard collimator 108 is a straight light beam coupled to an input 110 of a first implementation of a variable polarization independent optical power splitter 112. The variable polarization independent optical power splitter 112 has two outputs, 114 and 116, which are coupled through an output unit 117 comprising a roof prism 118 and dual fiber collimator 120, to the optical output fibers 104 and 106 respectively.

The variable polarization independent optical power splitter 112 comprises;
- a first polarization separator 122 (implemented by a birefringent displacer);
- a first fixed polarization rotator 124 (implemented by a half-wave plate);
- a variable polarization rotator 126 (implemented by a liquid crystal unit, or LC unit);
- a second polarization separator 128 (implemented by a second birefringent displacer);
- second and third fixed polarization rotators 130 and 132 respectively (also implemented by half-wave plates); and
- a polarization combiner 134 (implemented by a third birefringent displacer).

The elements (122 to 134) of the variable polarization independent optical power splitter 112 are assembled in such a manner that a light beam "A" at the input 110 is split into two light beams "B" and "C" by the first polarization separator 122. The light beam "B" travels through the first fixed polarization rotator 124, thus being converted into a light beam "D". The light beams "C" and "D" then travel through the variable polarization rotator 126, becoming light beams "E" and "F" respectively. The light beams "E" and "F" then further travel through the second polarization separator 128, being thereby split into four light beams "G" and "H" (from "E"), and "I" and "J" (from "F"). The two light beams "G" and "J" then pass through the second and third fixed polarization rotators 130 and 132, becoming light beams "K" and "L" respectively. Finally, the polarization combiner 134, receiving the light beams "H", "I", "K", and "L", combines these in pairs, generating two light beams "M" (from "H" and "L") and "N" (from "I" and "K") which emerge from the polarization combiner 134 to be respectively coupled to the outputs 114 and 116 of the variable polarization independent optical power splitter 112.

The three-dimensional diagram of the first embodiment of the invention 100, shown in FIG. 1, is a conceptual and approximate illustration of the spatial disposition of the optical components and light beams. A schematic diagram of the variable polarization independent optical power splitter 112 is shown in FIG. 2, using the same reference labels, and illustrating logically the passage of the light beams through the optical components.

Figure 2:
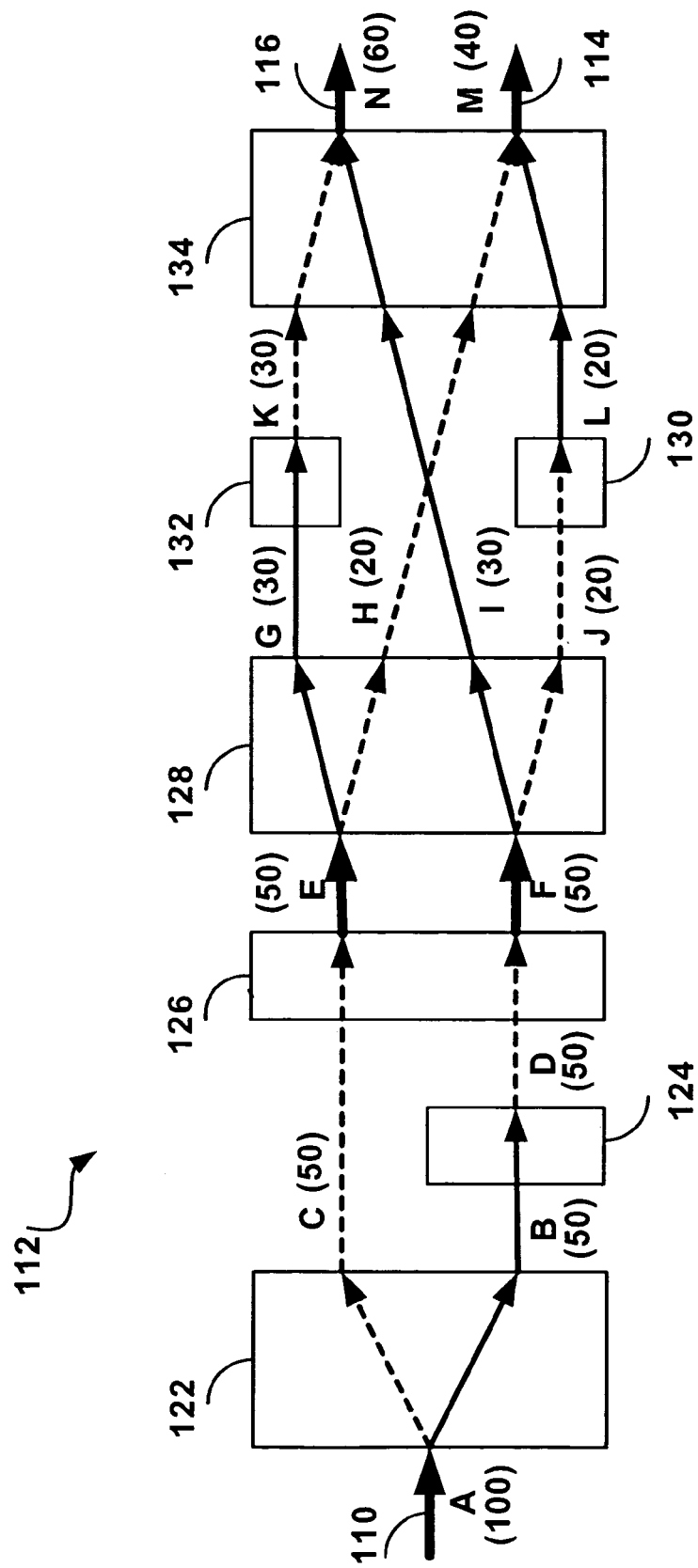
FIG. 2 is a schematic diagram of the variable polarization independent optical power splitter 112 of FIG. 1.

In FIG. 2, the style and thickness of the light beams indicates their polarization state: medium thickness and solid="P", dotted="S", and extra thickness=arbitrary or unknown ("P+S").

The operation of the variable polarization independent optical power splitter 112 may be understood by considering the polarization states of the light beams "A"-"N", as light passes through the elements of the variable polarization independent optical power splitter 112. Specific polarization states (or just polarization) of a polarized light beam are commonly referred to as "P" or "S". The polarizations "P" and "S" constitute an orthogonal set, similar to "X" and "Y" axes in a geometric sense. An arbitrary light beam contains light power of both "P" and "S" polarizations.

The input light beam "A" may be of an unknown or arbitrary polarization, in general, and may thus be said to contain a mixture of "P" and "S" polarized light power.

The first fixed polarization separator 122 separates the "P" and "S" components of the light beam "A" into the spatially distinct light beams "B" and "C", where "B" is a "P" polarized light beam and "C" is an "S" polarized light beam.

The fixed polarization rotator 124 (a half wave plate in this implementation) interchanges the specific polarization states of a light beam, thus "S" into "P" and vice versa.

The first fixed polarization rotator 124 which is next in the path of the light beam "B" converts the polarization of "B" from "P" to "S", thus providing the light beam "D" which is "S" polarized.

The combination of the first polarization separator 122 and the first fixed polarization rotator 124 thus splits the original light beam "A" into two component light beams, "C" and "D", both of which are "S" polarized, regardless of the polarization state of "A".

After the two "S" polarized light beams "C" and "D", pass through the variable polarization rotator 126, which has the capability of changing the polarization states of light beams passing through it, they emerge as light beams "E" and "F" respectively. The common polarization of "E" and "F" is under control of the variable polarization rotator 126, and may range from "S" to "P", including any combination of "S" and "P" components in any desired ratio "R". As implemented by a liquid crystal unit, or LC unit, the variable polarization rotator 126 is controlled by an external voltage applied to it (not shown in the diagrams), where the polarization rotation of the light beams passing through the variable polarization rotator 126 depends on the value of the applied external voltage.

The light beams "E" and "F", being of the desired polarization state, enter the second polarization separator 128, where the light beam "E" is split into its "P" component (light beam "G") and its "S" component (light beam "H"), and similarly the light beam "F" is split into its "P" component (light beam "I") and its "S" component (light beam "J").

The two light beams "G" ("P" polarized) and "J" ("S" polarized) then pass through the second and third fixed polarization rotators 130 and 132, becoming light beams "K" ("S" polarized) and "L" ("P" polarized) respectively.

Up to this point, before entering the polarization combiner 134, the original light beam "A" has been split into four light beams ("H", "I", "K" and "L"), two of which are "S" polarized ("H" and "K") and two of which are "P" polarized ("I" and "L"). Furthermore, the ratio of the combined optical power of the light beams "H" and "L" to the combined optical power of the light beams "I" and "K" will be the desired ratio "R".

Polarization combiners in general combine the power of two orthogonal polarizations into one single output. One of ordinary skill in the art will recognize that a polarization combiner is bidirectional and operates in a reverse fashion from a polarization separator. A polarization combiner accepts beams of orthogonally polarized light ("S" and "P") from two sources and combines them within a single common optical output.

The polarization combiner 134 is then used to combine the polarized light beams "H" and "L" into the light beam "M", and similarly combine the polarized light beams "I" and "K" into the light beam "N", the optical power ratio of the light beams "M" to "N" being the desired ratio "R".

In the first embodiment of the invention, the polarization separators 122 and 128, as well as the polarization combiner 134 are implemented as birefringent displacer bulk devices. In this way it is possible to employ single devices to handle multiple spatially distinct light beams in parallel. This feature is desirable in order to reduce the cost and complexity of the variable polarization independent optical power splitter 112.

Nevertheless, the close proximity of the light beams "M" and "N" at the outputs 114 and 116 of the variable polarization independent optical power splitter 112 necessitates the use of the roof prism 118 to separate the beams sufficiently for further transmission through the dual fiber collimator 120.

The overall functionality of the first embodiment of the invention 100 is thus to process the input light beam "A" and split it into the two output light beams "M" and "N" where the optical power ratio of the two output light beams "M" and "N" is adjusted to the ratio "R" by controlling the variable polarization rotator 126. The polarization components "P" and "S" of the input light beam "A" are separated in the first polarization separator 122 (i.e., the input light beam "A" is split into a pair of orthogonally polarized light beams "B" and "C"), then processed, until the processed components are recombined in the polarization combiner 134 so as to constitute the desired output light beams "M" and "N" having the desired optical power ratio "R". The polarization independence of the power split is thus achieved through the stratagem of processing the pair of "P" and "S" polarized components of the input light beam "A" (i.e. "B" and "C") separately—resulting in the four light beams "H", "I", "L" and "K" ("H" and "L" forming one pair, "I" and "K" forming another pair) which appropriately combined in the polarization combiner 134 yield the output light beams "M" and "N".

The function of the variable polarization independent optical power splitter 112 may be further described conveniently, using three sets of exemplary numerical values of the optical power levels, as illustrated in FIG. 2 (figures in brackets, only the first numerical example is marked in FIG. 2). Note that the numbers represent percentages (0 to 100) of the optical power of the input light beam "A", and ignore light losses that may occur in each of the optical elements of the variable polarization independent optical power splitter 112.

It is assumed, that:

for the first example the input light beam "A" is polarized at 45 degrees (equal "P" and "S" polarized components);

for the second example, the input light beam "A" is polarized with "P" and "S" polarized components in the ratio of 30 (P) to 70 (S);

the desired optical power ratio "R" in the first and second examples is 40:60 ("M":"N");

for the third example, the input light beam "A" is polarized at 45 degrees (equal "P" and "S" polarized components) and the desired optical power ratio "R" is 60:40 ("M":"N").

The following table then provides a list of the polarization states ("P", "S", or "P+S") and the exemplary optical power levels of the light beams in the variable polarization independent optical power splitter 112:

| Light beam | Polarization | Power (example 1) | Power (example 2) | Power (example 2) |
|---|---|---|---|---|
| A | P + S | 100(50 + 50) | 100(30 + 70) | 100(50 ± 50) |
| B | P | 50 | 30 | 50 |
| C | S | 50 | 70 | 50 |
| D | S | 50 | 30 | 50 |
| E | P + S | 50(30 + 20) | 70(42 + 28) | 50(20 + 30) |
| F | P + S | 50(30 + 20) | 30(18 + 12) | 50(20 + 30) |
| G | P | 30 | 42 | 20 |
| H | S | 20 | 28 | 30 |
| I | P | 30 | 18 | 20 |
| J | S | 20 | 12 | 30 |
| K | S | 30 | 42 | 20 |
| L | P | 20 | 12 | 30 |
| M | P + S | 40(20 + 20) | 40(28 + 12) | 60(30 + 30) |
| N | P + S | 60(30 + 30) | 60(18 + 42) | 40(20 + 20) |

Let it be noted that the polarization states (ratio of the "P" and "S" polarized components) of the output light beams "M" and "N" are same as the polarization state of the input light beam "A".

The numerical examples thus illustrate that the variable polarization independent optical power splitter 112 indeed provides the intended functions: polarization independence and a variable split ratio.

Further embodiments of the invention will now be described, using many of the same optical elements and their arrangement, from the first embodiment, and based fundamentally on the same stratagem as described above. Reference numerals of like elements will be incremented by 100 for each successive embodiment, to facilitate comparisons. Further, the same light beam signal names ("A" etc) will be used as much as is practical.

Second Embodiment 200 of the Invention

Figure 3:
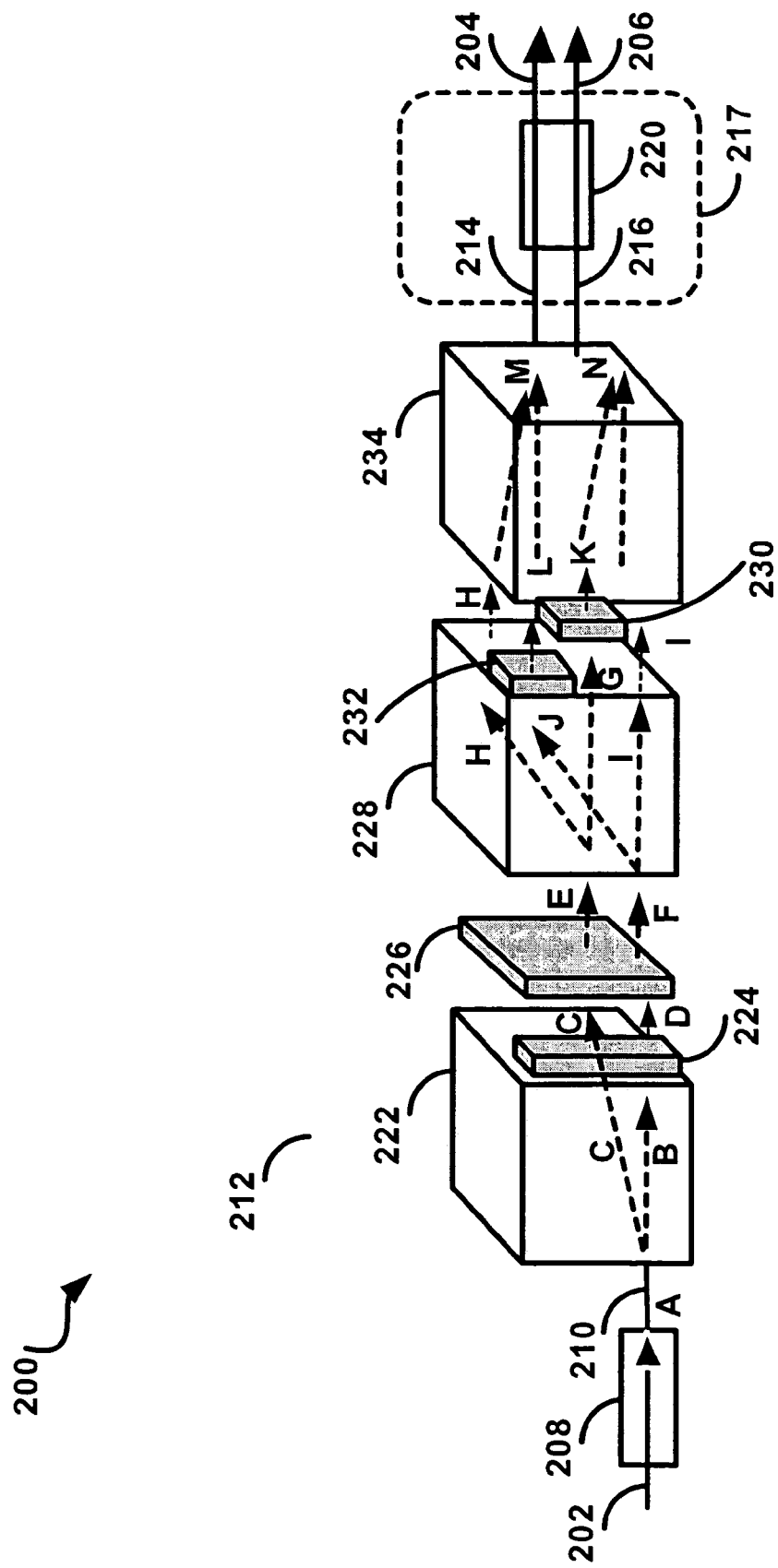
FIG. 3 is an illustration of a second embodiment of the invention, using a Wallaston prism.

FIG. 3 is an illustration of a second embodiment 200 of the invention, showing a 1:2 optical splitter. The second embodiment 200 of the invention is similar to the first embodiment 100, comprising many of the same elements, identified by the same reference numbers, incremented by 100.

The second embodiment of the invention 200 comprises a second implementation of a variable polarization independent optical power splitter 212 which is similar to the first implementation 112 with the following exceptions: instead of the second polarization separator 128 implemented by a second birefringent displacer (as in the first embodiment of the invention), the second embodiment includes a second polarization separator 228 implemented by a Wollaston prism; and an output unit 217 comprising a dual fiber collimator 220, but no roof prism (118 in the first embodiment) since it is not required.

Figure 4:
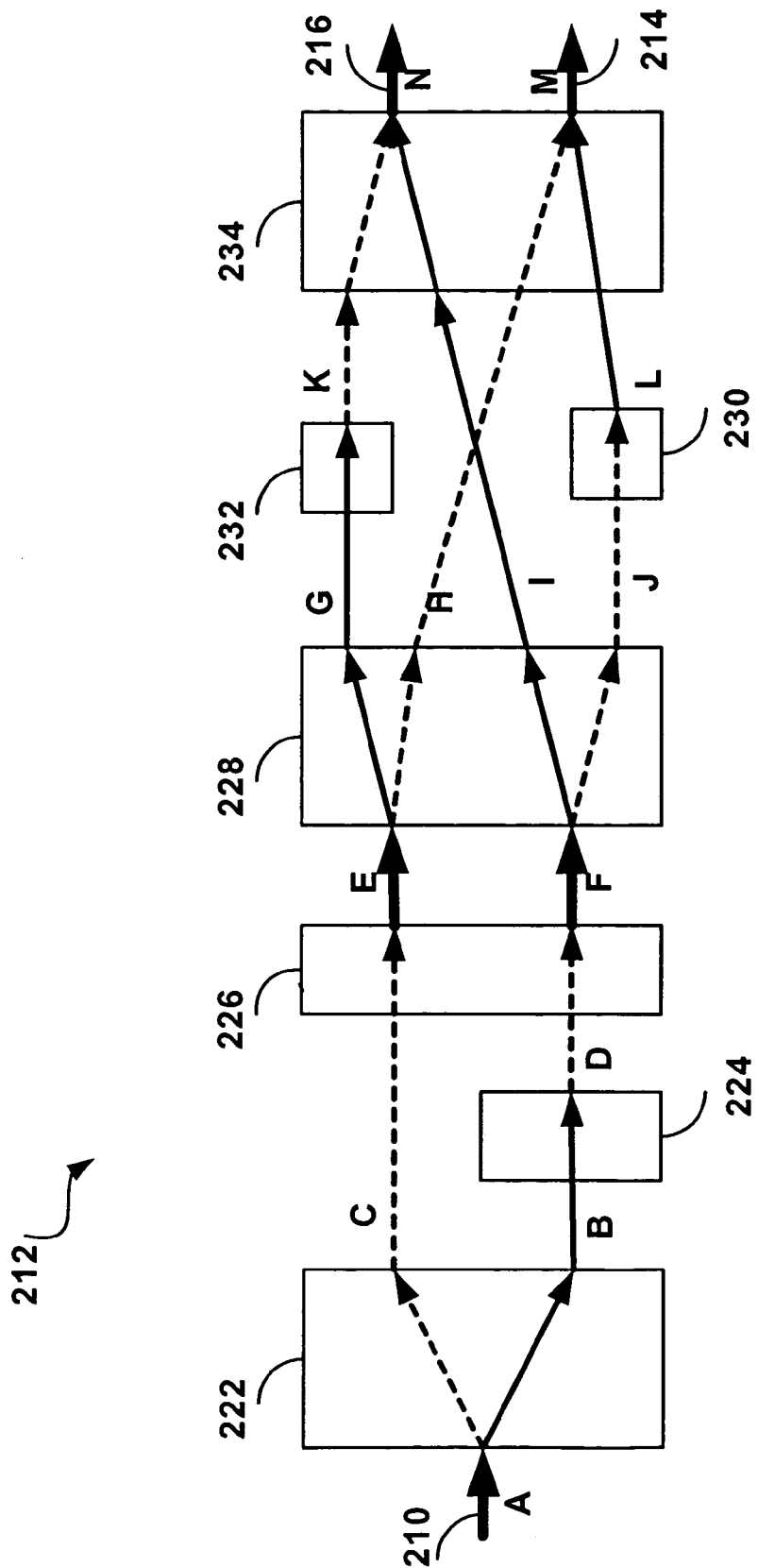
FIG. 4 is a schematic diagram of the variable polarization independent optical power splitter 212 of FIG. 3.

The three-dimensional diagram of the second embodiment of the invention 200, shown in FIG. 3, is a conceptual and approximate illustration of the spatial disposition of the optical components and light beams. A schematic diagram of the variable polarization independent optical power splitter 212 is shown in FIG. 4, using the same reference labels, and illustrating logically the passage of the light beams through the optical components.

Optical beams illustrating the functionality of the second embodiment of the invention 200 are labeled "A" to "N" in FIG. 3, corresponding to the equally labeled optical beams in the first embodiment 100 as shown in FIG. 1. The overall functionality of the second embodiment of the invention 200 is the same as the functionality of the first embodiment of the invention 100, namely to process the input light beam "A" and split it into the two output light beams "M" and "N" where the optical power ratio of the two output light beams "M" and "N" is adjusted to the ratio "R" by controlling the variable polarization rotator 226. The polarization components "S" and "P" of the input light beam "A" are split in the first polarization separator 222, then processed, until the processed components are recombined in the polarization combiner 234 so as to constitute the desired output light beams "M" and "N" having the desired optical power ratio "R".

A consequence of using the second polarization separator 228 implemented by a Wollaston prism (instead of a birefringent displacer) is that the emerging light beams "M" and "N" have sufficient spatial separation that they can be directly coupled into the dual fiber collimator 220 without the need for a roof prism.

Third Embodiment 300 of the Invention

Figure 5:
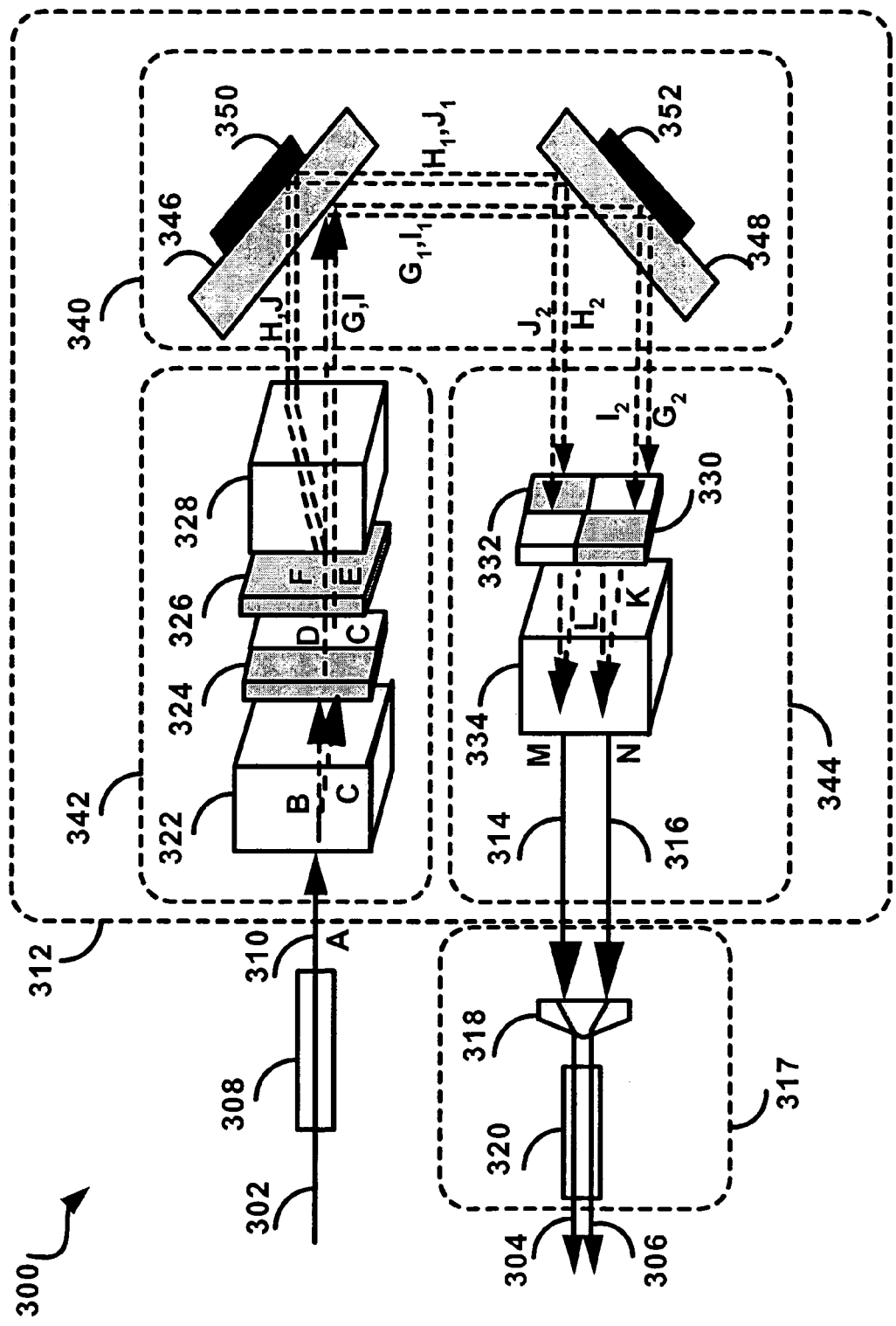
FIG. 5 is an illustration of a third embodiment of the invention, including split power monitoring.

FIG. 5 is an illustration of a third embodiment 300 of the invention, showing a 1:2 optical splitter. The third embodiment 300 of the invention is similar to the first embodiment 100, comprising all of the same elements, identified by the same reference numbers, incremented by 200. The third embodiment of the invention 300 comprises a third implementation of a variable polarization independent optical power splitter 312 which is similar to the first implementation 112, and in addition includes an optical deflection means 340.

Figure 6:
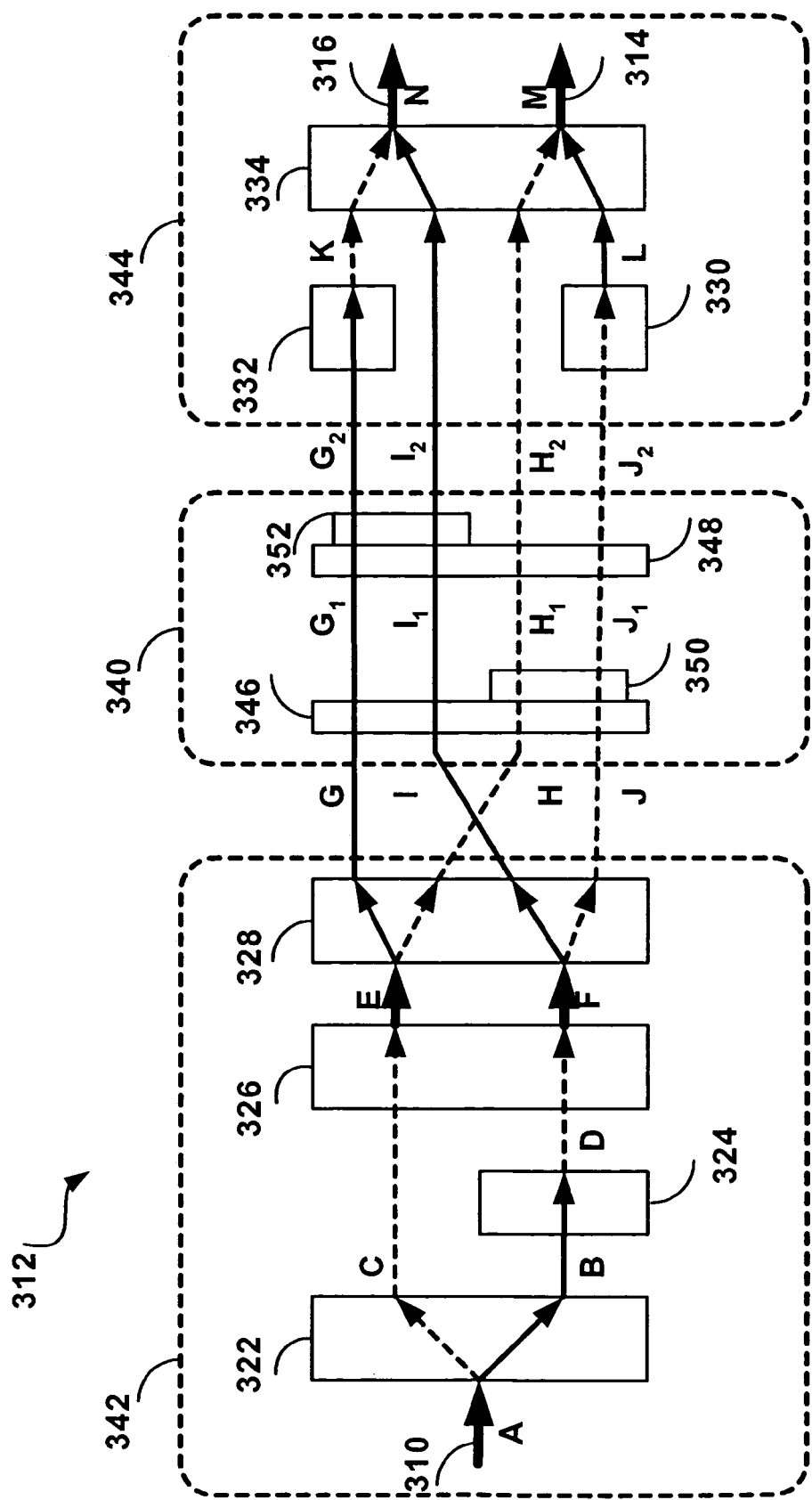
FIG. 6 is a schematic diagram of the variable polarization independent optical power splitter 312 of FIG. 5.

The three-dimensional diagram of the third embodiment of the invention 300, shown in FIG. 5, is a conceptual and approximate illustration of the spatial disposition of the optical components and light beams. A schematic diagram of the variable polarization independent optical power splitter 312 is shown in FIG. 6, using the same reference labels, and illustrating logically the passage of the light beams through the optical components.

The variable polarization independent optical power splitter 312 is thus comprised of three stages, an input stage 342, the optical deflection means 340, and an output stage 344.

The input stage 342 includes:
  a first polarization separator 322 (implemented by a birefringent displacer);
  a first fixed polarization rotator 324 (implemented by a half-wave plate);
  a variable polarization rotator 326 (implemented by a liquid crystal unit, or LC unit); and
  a second polarization separator 328 (implemented by a second birefringent displacer).

The optical deflection means 340 comprise first and second reflectors 346 and 348, each implemented as a mirror having a front and a back side; and two photo detectors 350 and 352 implemented by pin diodes mounted on the back sides of the reflectors 346 and 348 respectively. Each of the reflectors 346 and 348 has the property of reflecting substantially all (e.g. 95%) of the light impinging on its front side, and allowing a small fraction of the light (e.g. 5%) to pass through to its back side.

The output stage 344 includes:
  second and third fixed polarization rotators 330 and 332 respectively (implemented by half-wave plates); and
  a polarization combiner 334 (implemented by a third birefringent displacer).

Optical beams illustrating the functionality of the third embodiment of the invention 300 are labeled "A" to "N" in FIG. 5, corresponding to the equally labeled optical beams in the first embodiment 100 as shown in FIG. 1.

The light beams "G", "H", "I" and "J", after leaving the input stage 342, are reflected, first by the first reflector 346, and again by the second reflector 348, before arriving at the output stage 344.

The reflectors 346 and 348 may be arranged in a number of ways (relative positions and angles) to achieve different physical objectives. In the preferred embodiment, the physical objectives to be attained include compactness and arranging the input and outputs (302, 304, and 306) to face in the same direction. The reflector 346 is positioned to intercept the four light beams "G", "H", "I" and "J" at a 45 degree angle, thus deflecting them by 90 degrees. The resulting light beams, after reflection by the first reflector 346, are labeled "$G_1$", "$H_1$", "$I_1$" and "$J_1$". The second reflector 348 is positioned to intercept the four light beams "$G_1$", "$H_1$", "$I_1$" and "$J_1$" also at a 45 degree angle, thus deflecting them by another 90 degrees. The resulting light beams, after reflection by the second reflector 348, are labeled "$G_2$", "$H_2$", "$I_2$" and "$J_2$". It is understood that the labels "G", "$G_1$" and "$G_2$" for example refer to substantially the same light beam ("G") in terms of intensity and polarization, different suffixes merely indicating different positions of the light beam in its passage through the optical reflection means 340.

In the output stage 344, the four light beams "$G_2$", "$H_2$", "$I_2$" and "$J_2$" are received and further processed in the same manner as the corresponding light beams "G", "H", "I" and "J" of the first embodiment of the invention 100.

The photo detector 350 is mounted on the back side of the first reflector 346 in such a way as to intercept the small fraction of the light beams "H" and "J" that the reflector 346 allows to pass through. Similarly, the photo detector 352 is mounted on the back side of the second reflector 348 in such a way as to intercept the small fraction of the light beams "$G_1$" and "$I_1$" that the reflector 348 allows to pass through.

The function of each of the photo detectors 350 and 352 is thus to indirectly monitor the relative light power of the light beams "M" (which is the result of further processing and combining of the light beams "H" and "J") and "N" (which is the result of further processing and combining of the light beams "G" and "I").

In a variation of the third embodiment of the invention 300, the photo detectors 350 and 352 are omitted (thus not providing their functionality). In this case there is no requirement for the reflectors 346 and 348 to allow a small fraction of the light (e.g. 5%) to pass through to its back side. This variation of the third embodiment of the invention 300 still meets the objectives of compactness and of arranging the input and outputs (302, 304, and 304) to face in the same direction, while at the same time providing slightly higher efficiency, because no light power is needed for photo detectors.

Fourth Embodiment 400 of the Invention

Figure 7:
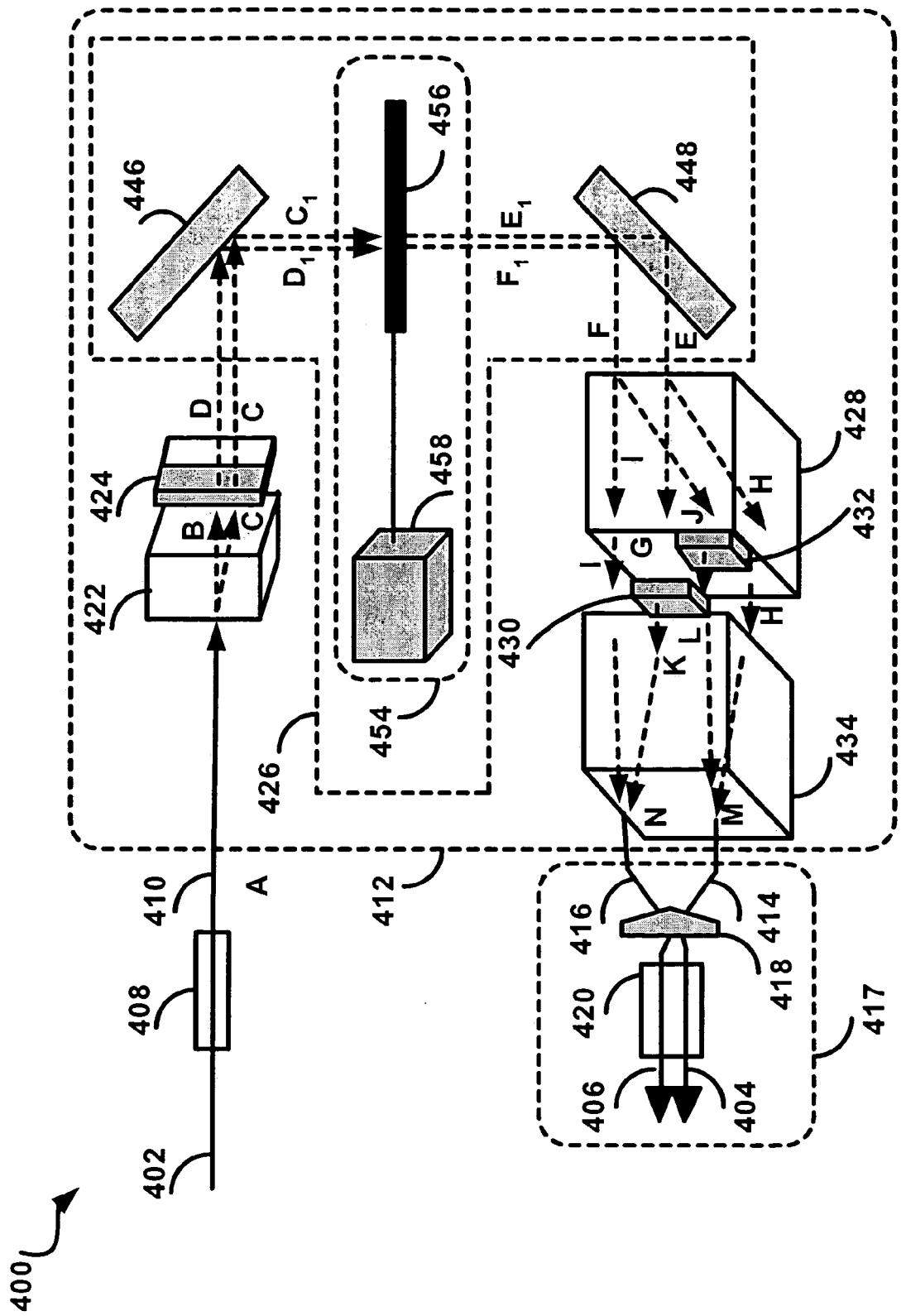
FIG. 7 is an illustration of a fourth embodiment of the invention, using a mechanically operated adjustment of the power split ratio.

FIG. 7 is an illustration of a fourth embodiment 400 of the invention, showing a 1:2 optical splitter. The fourth embodiment 400 of the invention is similar to the first embodiment 100, comprising all of the same elements, identified by the same reference numbers, incremented by 300. The fourth embodiment of the invention 300 comprises a fourth implementation of a variable polarization independent optical power splitter 412 which is similar to the first implementation 112. However, the variable polarization independent optical power splitter 412 comprises a variable polarization rotator 426 which, instead of being implemented by a LC unit (as is the variable polarization rotator 126 of the first embodiment 100), is implemented by an arrangement of optical elements comprising first and second reflectors 446 and 448, and an opto-mechanical polarization changer 454.

Figure 8:
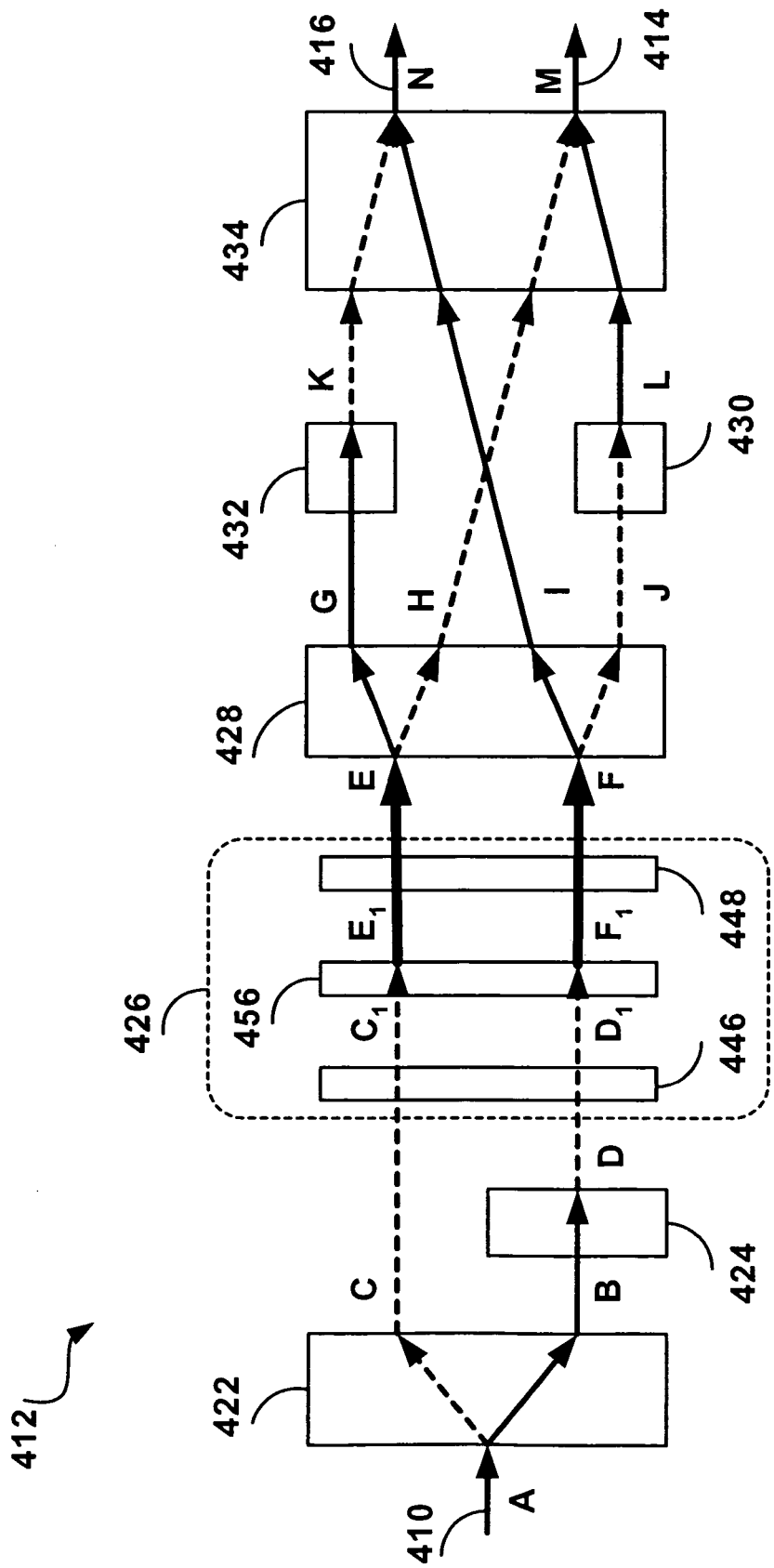
FIG. 8 is a schematic diagram of the variable polarization independent optical power splitter 412 of FIG. 7.

The three-dimensional diagram of the fourth embodiment of the invention 400, shown in FIG. 7, is a conceptual and approximate illustration of the spatial disposition of the optical components and light beams. A schematic diagram of the variable polarization independent optical power splitter 412 is shown in FIG. 8, using the same reference labels, and illustrating logically the passage of the light beams through the optical components.

The first and second reflectors 446 and 448 are preferably implemented as mirrors with full reflectivity.

The opto-mechanical polarization changer 454 comprises a retardation slope wave plate 456 (further described below, see FIG. 9), and an electromechanical actuator 458 (implemented with a stepping motor).

Optical beams in FIG. 7 illustrating the functionality of the fourth embodiment of the invention 400 are labeled "A" to "N", corresponding to the equally labeled optical beams in the first embodiment 100 as shown in FIG. 1.

The light beams "C", and "D" after leaving the first polarization separator 422 and the first fixed polarization rotator 424 respectively are reflected by the first reflector 446, as light beams "$C_1$" and "$D_1$".

It is understood that the labels "C" and "$C_1$", and "D" and "$D_1$", refer to substantially the same light beams ("C" and "D" respectively) in terms of intensity and polarization, the subscripts merely indicating their changed position in space.

After the two "S" polarized light beams "$C_1$" and "$D_1$", pass through the retardation slope wave plate 456 (of the opto-mechanical polarization changer 454 of the variable polarization rotator 426), which has the capability of changing the polarization states of light beams passing through it, they emerge as light beams "$E_1$" and "$F_1$" respectively. The polarization of "$E_1$" and "$F_1$" is under control of the opto-mechanical polarization changer 454, and may range from "S" to "P", including any combination of "S" and "P" components in any desired ratio "R". As implemented by the retardation slope wave plate 456 attached to the electromechanical actuator 458, the opto-mechanical polarization changer 454 is controlled by an electrical signal applied to the electromechanical actuator 458 (not shown in the diagrams), such that the polarization rotation of the light beams passing through the retardation slope wave plate 456 depends on the value of the applied electrical signal. In other words, the polarization state of the emerging light beams "$E_1$" and "$F_1$" depends on the part of the retardation slope wave plate 456 that intercepts the path of the light beams "$C_1$" and "$D_1$".

The light beams "$E_1$" and "$F_1$" after leaving the mechanical polarization changer 454 are reflected by the second reflector 448, as light beams "E" and "F".

Again, the labels "E", and "$E_1$", and "F" and "$F_1$", refer to substantially the same light beams ("E" and "F" respectively) in terms of intensity and polarization, the subscripts merely indicating their changed position in space.

The light beams "E" and "F" are received and further processed by the second polarization separator 428 in the same manner as the corresponding light beams "E" and "F" of the first embodiment of the invention 100.

Figure 9:
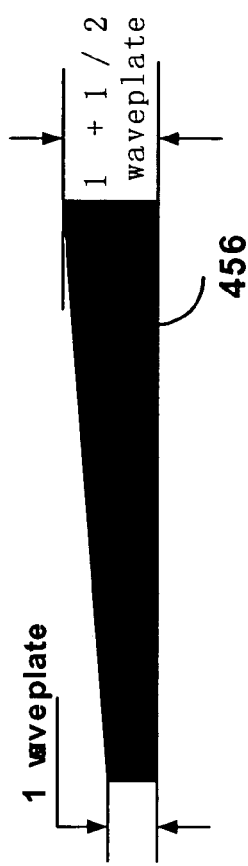
FIGS. 9 and 10 are illustrations of elements used in adjusting the power split ratio of the fourth embodiment of the invention.

The retardation slope wave plate 456 is illustrated in detail in FIG. 9. The thickness of the retardation slope wave plate 456 varies from a thickness of one wave length to a thickness of one and one-half wave length. Not shown in FIG. 9 is the mechanical support of the retardation slope wave plate 456, for example a transparent slice of glass.

In a variation of the fourth embodiment of the invention 400, the electromechanical actuator 458 may be replaced by a simple mechanical arrangement for manually moving the retardation slope wave plate 456, thus adjusting the optical power ratio of the light beams "M" to "N" to the desired ratio "R".

Figure 10:
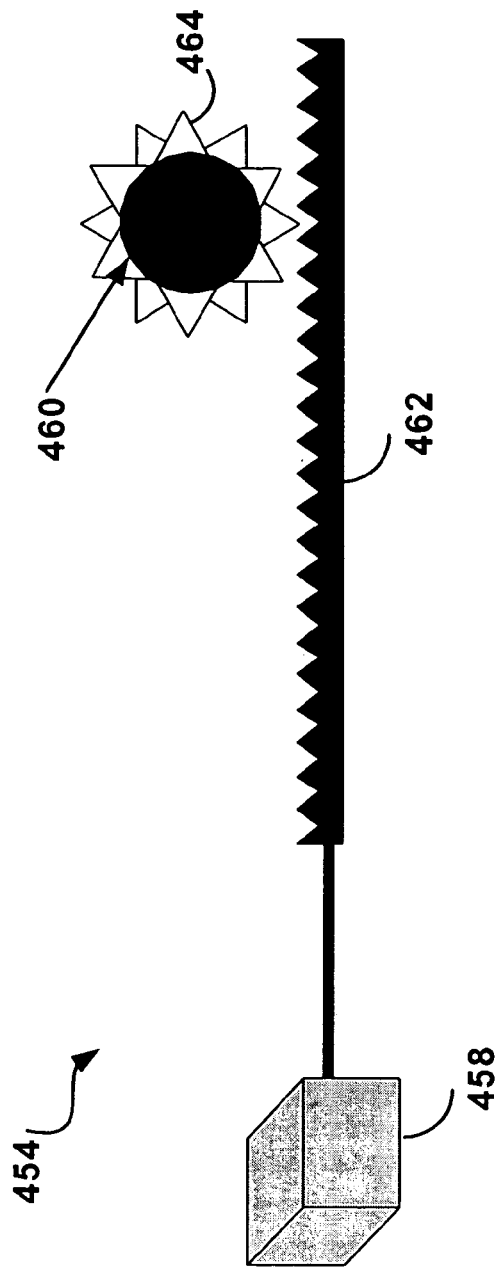

In a further variation of the fourth embodiment of the invention 400, the retardation slope wave plate 456 of the opto-mechanical polarization changer 454 is replaced by a rotatable half wave plate 460, coupled to the electromechanical actuator 458 by a rack 462 and pinion 464 arrangement, as illustrated in FIG. 10.

The half wave plate 460 is uniform in thickness. The polarization state of the light beam passing through is controllable because the optical axis of the wave plate 460 is rotatable. When the optical axis of this half wave plate is at 45 degree relative to the S polarization direction, an S polarized light beam will be turned into a P polarized light beam. When the axis of the half wave plate 460 is parallel with, or at 90 degree relative to, the S polarization direction, the S polarization state will be kept without any change. In other word, by rotating the angle of the half wave plate 460 over the range of 0 to 45 degree, the S polarization of an input light beam can be turn into any combination of S+P states of the output light beam.

Fifth Embodiment 500 of the Invention

A trivial 1:4 optical splitter could be built by cascading several 1:2 splitters constructed according to any of the first four embodiments 100–400. One such arrangement would be to use three 1:2 splitters, a primary splitter, followed by two secondary 1:2 splitters to further split each of the output beams of the primary splitter. A disadvantage of that solution would be the higher cost, and lower efficiency, of the optical components, including collimators, polarization separators, and polarization combiners at the polarization independent junction of the primary and secondary splitters. These disadvantages are avoided in a fifth embodiment 500 of the invention.

Figure 11:
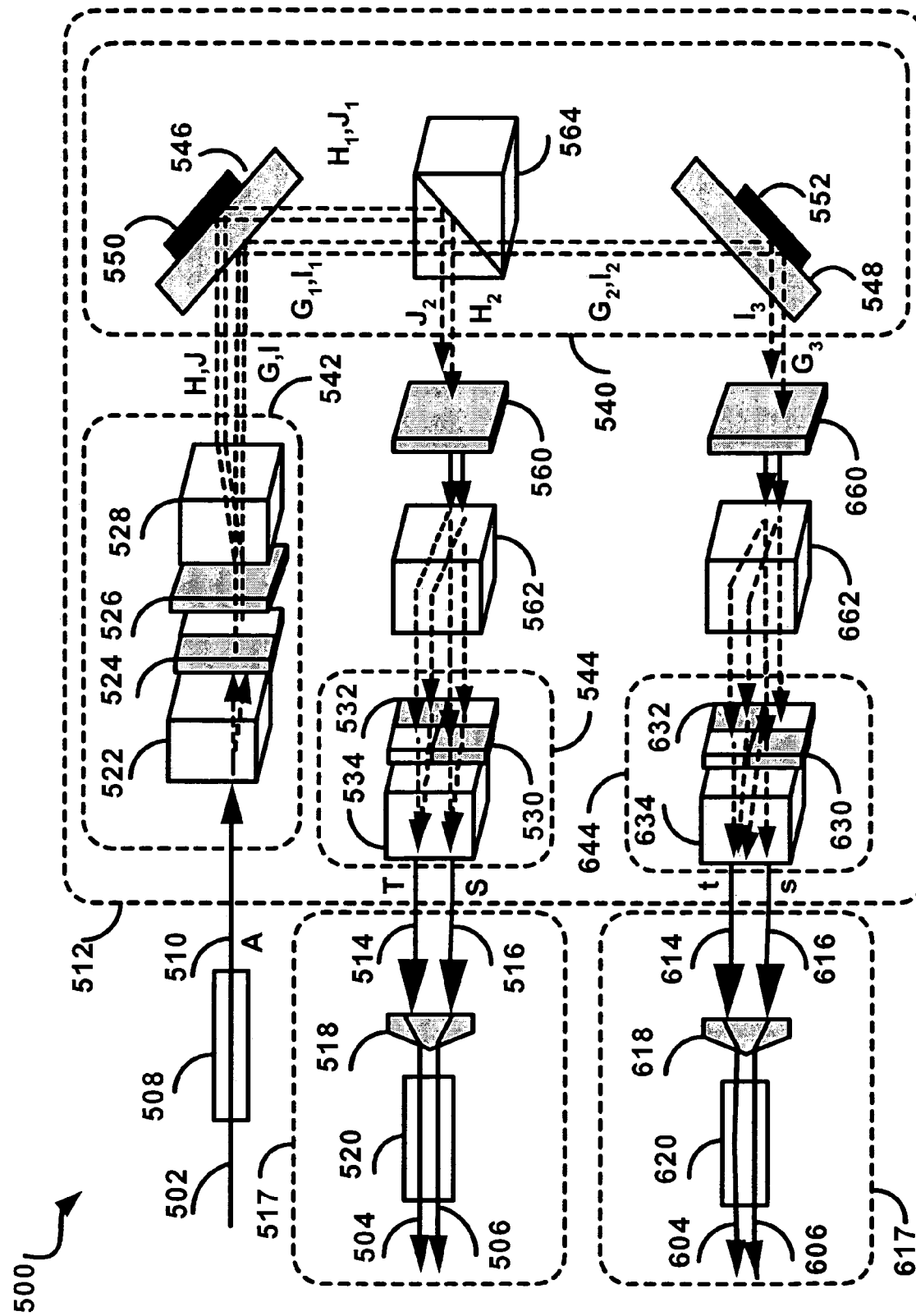
FIG. 11 is an illustration of a fifth embodiment of the invention, providing a 1:4 split.

FIG. 11 is an illustration of the fifth embodiment 500 of the invention, implementing a 1:4 optical splitter. The fifth embodiment 500 of the invention is similar to the third embodiment 300 (a 1:2 optical splitter), comprising all of the same elements, identified by the same reference numbers incremented by 200 (common elements) or 300 (additional similar elements), as well as additional elements.

Generally speaking, the 1:4 splitter of the fifth embodiment 500 is constructed using the same general principles as the first four embodiments 100–400: a combination of polarization separators, fixed and variable polarization rotators, and polarization combiners are assembled such as to split input light beams into "P" and "S" polarized components (polarization separators), change the polarization of light beams by a fixed amount (convert between "S" and "P", using fixed polarization rotators), vary their polarization (using variable polarization rotators), and recombine polarized light beams into output light beams (using polarization combiners).

In the fifth embodiment 500, the 1:4 optical splitter function is achieved more efficiently than the trivial solution outlined above by integrating the primary and secondary splitters without intermediate combining and re-splitting of the "P" and "S" polarized components of the light beams, thus eliminating the several collimators, polarization separators, and polarization combiners of the trivial 1:4 optical splitter.

The 1:4 optical splitter of the fifth embodiment 500 of the invention comprises:
a standard collimator 508;
a fifth implementation of a variable polarization independent optical power splitter 512;
an output unit 517 (comprising a roof prism 518 and a dual fiber collimator 520);
and
an additional output unit 617 (comprising an additional roof prism 618 and an additional dual fiber collimator 620).

The variable polarization independent optical power splitter 512 includes:
an expanded optical deflection means 540 (similar to the optical deflection means 340 of the third embodiment 300);
an input stage 542 (a copy of the input stage 342 of the third embodiment 300);
an output stage 544 (a copy of the output stage 344 of the third embodiment 300);
a first additional variable polarization rotator 560 (implemented by a liquid crystal unit, or LC unit);
a first additional polarization separator 562 (implemented by a birefringent displacer);
an additional output stage 644 (also a copy of the output stage 344 of the third embodiment 300);
a second additional variable polarization rotator 660 (implemented by a liquid crystal unit, or LC unit);
a second additional polarization separator 662 (implemented by a birefringent displacer).

The expanded optical deflection means 540, being similar to the optical deflection means 340 of the third embodiment 300, includes:
first and second reflectors 546 and 548, each implemented as a mirror having a front and a back side;
first and second photo detectors 550 and 552 mounted on the back sides of the first and second reflectors 546 and 548 respectively;
and (in addition)
a polarized beam splitter 564 (implemented as a polarized beam splitter [PBS] cube).

The fifth embodiment of the invention 500 has an optical input fiber 502, and four optical output fibers 504, 506, 604, and 606. The optical input fiber 502 is coupled to a standard collimator 508. The output of the standard collimator 508 is directed to an input 510 of the variable polarization independent optical power splitter 512. The variable polarization independent optical power splitter 512 has two pairs of outputs, namely outputs 514 and 516 from the output stage 544, and two additional outputs 614 and 616 from the additional output stage 644. The outputs 514 and 516 are coupled through the output unit 517 (comprising the roof prism 518, and the dual fiber collimator 520), to the optical output fibers 504 and 506 respectively. Similarly, the additional outputs 614 and 616 are coupled through the additional output unit 617 (comprising the additional roof prism 618, and the additional dual fiber collimator 620), to the optical output fibers 604 and 606 respectively. The straight light beams at the input 510 and the outputs 514, 516, 614, and 616 are labeled "A", "T", "S", "t", and "S" respectively.

The four-way splitting function of the fifth embodiment 500, is provided by the variable polarization independent optical power splitter 512, which splits the input light beam "A" into the four output light beams "S", "T", "s", and "t" in any desired ratio.

The three-dimensional diagram of the fifth embodiment of the invention 500, shown in FIG. 11, is a conceptual and approximate illustration of the spatial disposition of the optical components and light beams. A schematic diagram of the variable polarization independent optical power splitter 512 is shown in FIG. 12, using the same reference labels, and illustrating logically the passage of the light beams through the optical components.

The operation of the variable polarization independent optical power splitter 512 will now be described in more detail with the aid of FIG. 12.

Figure 12:
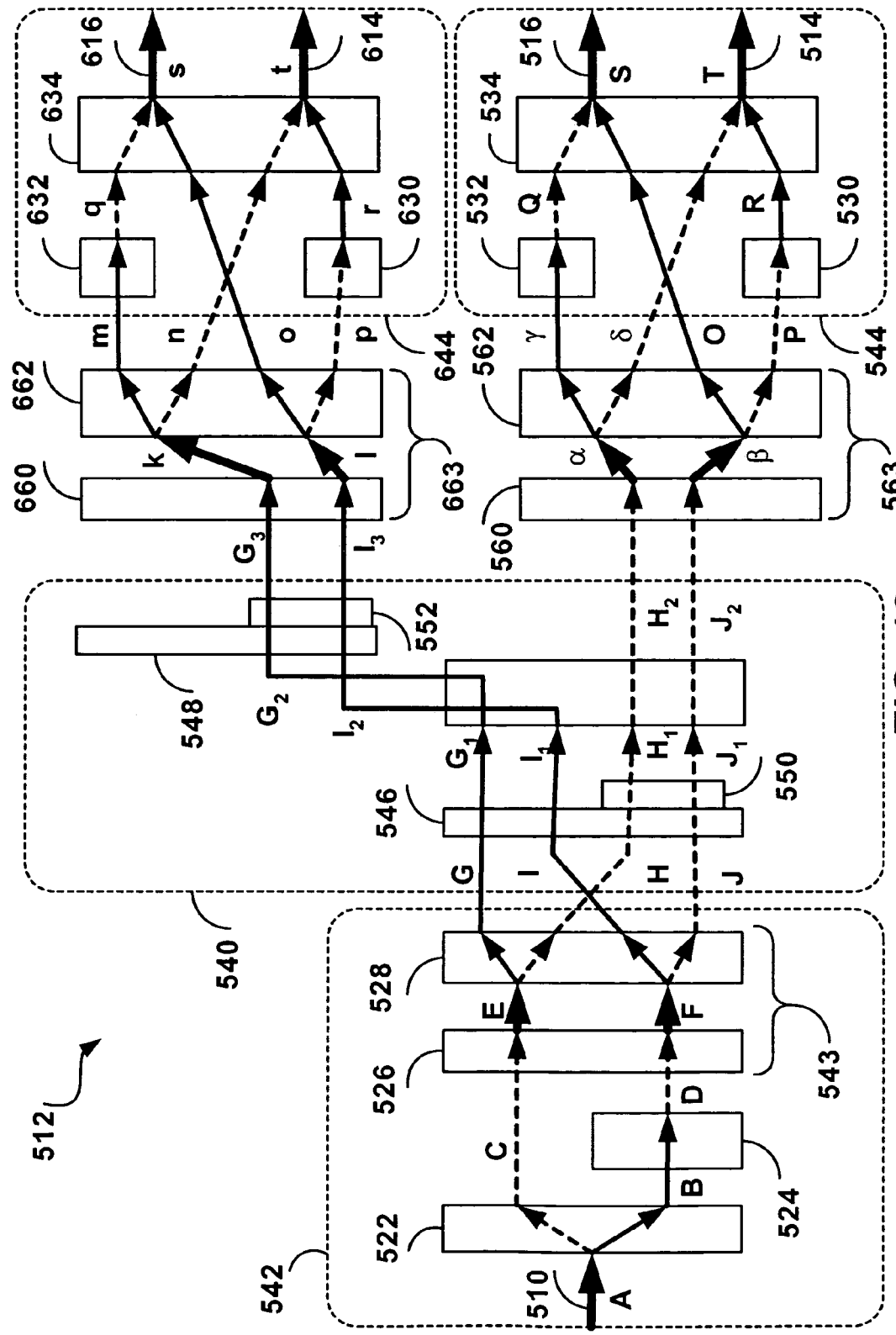
FIG. 12 is a schematic diagram of the variable polarization independent optical power splitter 512 of FIG. 11.

Referring to FIG. 12, it is convenient to refer to the combination of the variable polarization rotator 526 and the second polarization separator 528 within the input stage 542, as a first block 543.

Similarly, the combination of the first additional variable polarization rotator 560 and the first additional polarization separator 562 will be referred to as a first additional block 563, and the combination of the second additional variable polarization rotator 660 and the second additional polarization separator 662 as a second additional block 663.

The operation of the input stage 542, i.e. the processing of the input light beam "A" into the light beams "G", "H", "I", and "J", is analogous to the same operation of the input stage 342 of the third embodiment 300.

Similarly, the operation of the output stages 544 and 644 is analogous to the operation of the output stage 342 of the third embodiment 300, namely to further process four input light beams into a pair of output light beams ("γ","δ", "O", and "P" into "S" and "T" in the case of the output stage 544; and "m", "n", "o", and "p" into "s" and "t" in the case of the output stage 644).

Inserted between the input stage 524 and the output stages 544 and 644 are the expanded optical deflection means 540 and the first and second additional blocks 563 and 663 (comprising the variable polarization rotators 560 and 660, and the first and second additional polarization separators 562 and 662).

The light beams "G", "H", "I", and "J" from the input stage 542 are routed, without changing their polarization states, by the optical elements of the expanded optical deflection means 540 as follows. All four light beams "G", "H", "I", and "J" are deflected by the first reflector 546, preferably by 90 degrees. The first reflector 546, like the first reflector 346 of the third embodiment 300, allows a small fraction of the light (e.g. 5%) to pass through to the first photo detector 550 mounted on its back side. The first reflector 546 is positioned so that only the light beams "H" and "J" (i.e. the small fraction of their light) impinge on the first photo detector 550. The four reflected light beams are labeled "$G_1$", "$I_1$", "$H_1$" and "$J_1$".

The four reflected light beams "$G_1$", "$I_1$", "$H_1$" and "$J_1$" then travel to the polarized beam splitter 564 which works in such a way as to allow the two P polarization light beams "$G_1$" and "$I_1$" to pass through in a straight line, while the two S polarization light beams "$H_1$" and "$J_1$" are deflected by an angle, preferably 90 degrees. The four light beams emerging from the polarized beam splitter 564 are labeled "$G_2$" and "$I_2$" (straight through), and "$H_2$" and "$J_2$" (deflected).

The light beams "$G_2$" and "$I_2$" are deflected in the second reflector 548, again preferably by 90 degrees. Again, the second reflector 548 allows a small fraction of the light (e.g. 5%) to pass through to the second photo detector 552 mounted on its back side. The second reflector 548 is positioned so that the light beams "$G_2$" and "$I_2$" (i.e. the small fraction of their light) impinge on the second photo detector 552. The reflected light beams are labeled "$G_3$" and "$I_3$".

Briefly summarizing in the matter of the input stage 542 and the expanded optical deflection means 540, the input light beam "A" entering the input stage 542 in a certain spatial direction, is processed (split) into the four light beams "$G_3$", "$I_3$", "$H_2$" and "$J_2$" emerging from the expanded optical deflection means 540 in another spatial direction, preferably the opposite direction (turned 180 degrees) of the light beam "A".

The two P polarization light beams "$H_2$" and "$J_2$" then travel through the first additional variable polarization rotator 560, becoming light beams "α" and "β" respectively. The light beams "α" and "β" travel through the first additional polarization separator 562, being thereby split into four light beams "γ" and "δ" (from "α"), and "O" and "P" (from "β"). These four light beams ("γ", "δ", "O", and "P") then enter the output stage 544 (which is similar to the output stage 344 of the third embodiment), to emerge as the output light beams "S" and "T", at the outputs 514 and 516 of the variable polarization independent optical power splitter 512.

The light beams "$H_2$" and "$J_2$" are thus further split and recombined into the output light beams "S" and "T" in a manner fully analogous to the processing of the light beams "C" and "D" into the output light beams "M" and "N" in the first embodiment 100.

In a similar manner, the two S polarization light beams "$G_3$" and "$I_3$" are processed into the output light beams "s" and "t" through the second additional variable polarization rotator 660, the second additional polarization separator 662, and the additional output stage 644.

Summarizing the concept of the operation of the 1:4 optical splitter of the fifth embodiment of the invention 500 (without mentioning the expanded optical deflection means 540):

the input light beam "A" is separated (split) into a pair of orthogonally polarized light beams, i.e. the light beams "B" and "C", by the first polarization separator 522;

the polarization state of one of the light beams ("B") of the pair of light beams from the first polarization separator 522 is converted into the other polarization by the first fixed polarization rotator 524, resulting in the light beam "D" (which has the same polarization state as the unchanged light beam "C");

the pair of light beams of equal polarization ("C" and "D") is split into two pairs of light beams ("G"+"I", and "H"+"J") by the first block 543; the resulting the light beams of each pair again have the same polarization;

splitting one of the two pairs ("H"+"J") again, using the first additional block 563, resulting in two pairs of light beams ("α"+"γ" and "β"+"δ"), the resulting light beams of each pair again having the same polarization;

splitting the other pair ("G"+"I") again, using the second additional block 663, resulting in two pairs of light beams ("m"+"o" and "n"+"p"), the resulting light beams of each pair again having the same polarization;

finally using the output stages 544 and 644 to combine pairs of equal polarization into the output beams ("α"+"γ" becomes "S", "β"+"δ" becomes "T", "m"+"o" becomes "s", and "n"+"p" becomes "t").

A larger splitting ratio than 1:4 may be achieved by creating a hierarchical arrangement of blocks, similar to the blocks 543, 563, and 663, and taking the equal-polarization light beams from the first and subsequent blocks and splitting them further in additional blocks, until the desired splitting ratio is reached. Thus, a hierarchical splitting tree may be built, splitting pairs of light beams having the same polarization state at each stage. Only the outputs from the final blocks need be combined into single light beams (using output stages similar to the output stages 544 and 644).

The overall split (ratio) of optical powers is adjusted by adjusting the variable polarization rotator in each block, as will now be explained for the case of the 1:4 optical splitter.

Let the ratio (a:b:c:d) be an arbitrary desired ratio of optical powers into which the input light beam "A" is to be split among the four output light beams "S", "T", "s", and "t". This ratio may be achieved by adjusting the variable polarization rotators 526, 560, and 660 as follows:

The variable polarization rotators 526 is adjusted until the ratio of the light power (which may be monitored by the photo detectors 550 and 552) is equal to (a+b):(c+d). The first additional variable polarization rotator 560 is adjusted until the optical power of the output light beams "S" and "T" is equal to (a:b), and the second additional variable polarization rotator 660 is adjusted until the light power of the output light beams "s" and "t" is equal to (c:d).

In a similar manner as was demonstrated through numerical examples for the first embodiment 100, the output light beams "S", "T", "s", and "t" of the variable polarization independent optical power splitter 512 of the fifth embodiment 500 will have the same polarization state as the input light beam "A". The ratio of their optical powers may be independently adjusted to the desired ratio (a:b:c:d).

One of ordinary skill in the art will recognize that numerous modifications that may be made to the fifth embodiment 500 of the invention including, but not limited to;

the use of Wollaston prisms in the implementation of any or all of the polarization separators 528, 562, and 662, similar to the second embodiment 200;

the use of mechanical or electromechanical device in the implementation of any or all of the polarization rotators 526, 560, and 660, similar to the fourth embodiment 400;

the elimination of the photo detectors 550 and 552, and using other means for monitoring the split optical powers; and the addition of further deflection means (with or without photo detectors) to spatially separate the four pairs of light beams "γ"+"O", "δ"+"P", "m"+"o", and "n"+"p" for the purpose of monitoring their optical powers, or for any other reasons.

The five embodiments of the invention described here, and their variations, illustrate a number of ways in which polarization independent power splitters providing variable split ratios of 1:2 and 1:4 may be constructed. These may be extended by someone of ordinary skill to construct similar splitters of other split ratios, such as 1:8 and higher, simply by the addition of further optical deflection means, further variable polarization rotators and polarization separators, and further output stages.

Another application of the invention is as an element in the construction of an optical switch where, by selecting a power ratio of "all:nothing" or "nothing:all" an input light beam may be completely directed to one or the other port.

Thus, although particular embodiments of the invention have been described in detail, it can be appreciated that alternatives, such as those mentioned above and numerous other changes, variations, and adaptations may be made without departing from the scope of the invention as defined in the following claims.

What is claimed is:

1. A method for splitting the power of an input light beam of an arbitrary polarization, having an internal power ratio P/S between its P and S polarized components, into a required number of output light beams, the method comprising the steps of:

(a) splitting the input light beam into a pair of orthogonally polarized light beams;

(b) converting the polarization state of one of the light beams of the pair of the step (a) into the other polarization, while leaving the polarization of the other light beam in the pair unchanged;

(c) rotating the polarization state of the pair of light beams from the previous step (b) in an adjustable manner, resulting in the two light beams of the pair having the same rotated polarization;

(d) splitting each of the light beams of the pair after the step (c) into two orthogonally polarized light beams, resulting in four light beams, each two of which forming a pair of the same polarization;

(f) for each pair of light beams of the step (d), repeating the steps (c) to (d), each time doubling the number of light beam pairs until the number of light beam pair is not less than the required number of output light beams; and (g) for each of the required number of output light beams:
  (i) selecting a pair of light beams from the step (f);
  (ii) converting the polarization state of one of the selected light beams of the pair of the step (i) into the orthogonal polarization, while leaving the polarization of the other light beam of the pair unchanged; and
  (iii) combining the light beams of the pair from the step (ii) into one of the output light beams;

wherein the power ratio is adjustable between all the output light beams and is substantially independent of the polarization of the input light beam; and wherein an internal power ratio between P and S polarized components in each output light beam is substantially the same as the said internal power ratio P/S in the input light beam.

2. A method as described in claim 1, wherein the required number of the output beams comprises two output beams, first and second output light beams, and wherein:

the step (f) comprises repeating the steps (c) to (d) zero times; and the step (g) comprises for the first output beam:
  (i) selecting the two beams after the step (d) of the same polarization;
  (ii) changing the polarization of one of the selected two beams in the step (i) into the other orthogonal polarization; and
  (iii) combining the light beams from the step (ii) into the first output light beam; and the step (g) comprises for the second output beam:
  (i') selecting the other two beams after the step (d) of the same polarization;
  (ii') changing the polarization of one of the selected two beams in the step (i') into the other orthogonal polarization; and
  (iii') combining the light beams from the step (ii') into the second output light beam.

3. An optical power splitter for splitting the power of an input light beam of an arbitrary polarization, having an internal power ratio P/S between its P and S polarized components, into a required number of output light beams, the optical power splitter comprising:

(a) means for splitting the input light beam into a pair of orthogonally polarized light beams;

(b) means for convening the polarization state of one of the light beams of the pair outputted from the means (a) into the other polarization, while leaving the polarization state of the other beam of the pair unchanged;

a first block, including:

(c) means for rotating the polarization state of the pair of light beams from the means (b) in an adjustable manner, resulting in the two light beams of the pair having the same rotated polarization;

(d) means for splitting each of the light beams of The pair after the means (c) into two orthogonally polarized light beams, resulting in four light beams, each two of which forming a pair of the same polarization state;

(f) a hierarchical arrangement of additional blocks including means the same as the means (c) and (d) sufficient in number to produce the required number of output light beams, each block receiving one pair of light beams from the first block or another block of the hierarchical arrangement; and (g) an output means for each of the required number of output light beams, comprising:

(i) means for converting the polarization state of one of the light beams of a selected pair of the light beams from the hierarchical arrangement (f) into the orthogonal polarization, while leaving the polarization of the other light beam of the selected pair unchanged; and (ii) means for combining the light beams of the pair after the means (i) into one of the output light beams, wherein an internal power ratio between P and S polarized components in each output light beam is substantially the same as the said internal power ratio P/S in the input light beam; and wherein the power ratio between all the output light beams is adjustable by adjusting the means (c), and is substantially independent of the polarization of the input light beam.

4. An optical power splitter as described in claim 3, wherein the required number of the output beams comprises two output beams, first and second output light beams and wherein:

the hierarchical arrangement (f) of additional blocks comprises zero blocks; and the output means (g) for the first output beam comprises:

(i) means for changing the polarization of one of the two beams after the means (d) of the same polarization into the other orthogonal polarization; and (ii) means for combining the light beams from the means (i) into the first output light beam; and the output means (g) for the second output beam comprises:

(i') means for changing the polarization of one of the other two beams out of the four light beams after the means (d) of the same polarization into the other orthogonal polarization; and (ii') means for combining the light beams from the means (i') into the second output light beam.

5. An optical power splitter as described in claim 3, wherein the power of the input light beam "A" of an arbitrary polarization is split into two output light beams "M" and "N" having an adjustable power ratio between the beams, the power ratio being substantially independent of the polarization of the light beam "A", and wherein:

the means (a) comprises a first polarization separator receiving the light beam "A" and splitting said beam "A" into a light beam "B" having one of the P-polarization and S-polarization, and a light beam "C" having the other polarization;

the means (b) comprises a first fixed polarization rotator receiving said light beam "B" and converting it into a light beam "D" having the same polarization as the light beam "C";

the means (c) comprises a variable polarization rotator receiving said light beams "C" and "D", rotating their polarization in an adjustable manner, thus converting the light beams "C" and "D" into light beams "E" and "F" having the same rotated polarization respectively;

the means (d) comprises a second polarization separator receiving said light beams "E" and "F", and splitting said beam "E" into a light beam "G" having one of the P-polarization and S-polarization, and a light beam "H" having the other polarization;

and splitting said beam "F" into a light beam "I" having the same polarization as the light beam "G", and a light beam "J" having the same polarization as the light beam "H";

the hierarchical arrangement (f) of additional blocks comprises zero blocks;

the output means (g) for the output beam "M" comprises:

(i) a second fixed polarization rotator receiving the light beam "J" having one of the P-polarization and S-polarization, and converting it into a light beam "L" having the other polarization; and (ii) a polarization combiner combining the light beams "H" and "L" into the light beam "M"; and the output means (g) for the output beam "N" comprises:

(i') a third fixed polarization rotator receiving the light beam "G" having one of the P-polarization and S-polarization, and converting it into a light beam "K" having the other polarization; and (ii') a polarization combiner combining the light beams "K" and "I" into the light beam "N".

6. An optical power splitter as described in claim 5, wherein the second polarization separator is a birefringent displacer.

7. An optical power splitter as described in claim 5, wherein the second polarization separator is a Wollaston prism.

8. An optical power splitter as described in claim 5, wherein the first polarization separator and the polarization combiner are birefringent displacers.

9. An optical power splitter as described in claim 5, wherein the variable polarization rotator is a liquid crystal unit.

10. An optical power splitter as described in claim 5, wherein the variable polarization rotator is an opto-mechanical polarization changer.

11. An optical power splitter as described in claim 10, wherein the opto-mechanical polarization changer has a retardation slope wave plate coupled to a electromechanical actuator.

12. An optical power splitter as described in claim 10, wherein the opto-mechanical polarization changer has a rotatable half wave plate coupled to a electromechanical actuator.

13. An optical power splitter as described in claim 10, further comprising an optical deflection means including a first reflector for reflecting the light beams "C" and "D" in space, and a second reflector for reflecting the light beams "E" and "F" in space.

14. An optical power splitter as described in claim 5, wherein the first, second and third fixed polarization rotators are half wave plates.

15. An optical power splitter as described in claim 5, further comprising a collimator for collimating the light beam "A".

16. An optical power splitter as described in claim 5, further comprising an output unit including a dual fiber collimator for receiving and collimating the light beams "M" and "N".

17. An optical power splitter as described in claim 16, wherein the output unit further comprises a roof prism.

18. An optical power splitter as described in claim 5, further comprising an optical deflection means including at least one reflector for reflecting the light beams "G", "H", "I" and "J" in space.

19. An optical power splitter as described in claim 18, wherein said at least one reflector includes means for detecting a small fraction of at least one of the light beams being reflected.

20. An optical power splitter as described in claim 18, wherein the optical deflection means includes first and second reflectors to reflect the beams by substantially 180 degrees.

* * * * *